(12) United States Patent
Chaston et al.

(10) Patent No.: US 10,873,357 B2
(45) Date of Patent: Dec. 22, 2020

(54) SMART ATTACHMENT FOR A WORK VEHICLE

(71) Applicant: Deere & Company, Moline, IL (US)

(72) Inventors: Keith N. Chaston, Dubuque, IA (US); Brent A. Smith, Dubuque, IA (US)

(73) Assignee: Deere & Company, Moline, IL (US)

( * ) Notice: Subject to any disclaimer, the term of this patent is extended or adjusted under 35 U.S.C. 154(b) by 784 days.

(21) Appl. No.: 15/584,177

(22) Filed: May 2, 2017

(65) Prior Publication Data
US 2018/0323816 A1 Nov. 8, 2018

(51) Int. Cl.
| | |
|---|---|
| *H04B 1/3827* | (2015.01) |
| *H01Q 1/40* | (2006.01) |
| *H04L 29/08* | (2006.01) |
| *H01Q 1/32* | (2006.01) |
| *H01Q 1/22* | (2006.01) |
| *H01Q 1/12* | (2006.01) |
| *H01Q 9/42* | (2006.01) |
| *H01Q 3/18* | (2006.01) |

(52) U.S. Cl.
CPC ......... *H04B 1/3827* (2013.01); *H01Q 1/1207* (2013.01); *H01Q 1/2225* (2013.01); *H01Q 1/32* (2013.01); *H01Q 1/40* (2013.01); *H04L 67/12* (2013.01); *H01Q 3/18* (2013.01); *H01Q 9/42* (2013.01)

(58) Field of Classification Search
CPC .. H04B 1/3828; H01Q 1/1207; H01Q 1/2225; H01Q 1/32; H01Q 1/40; H04L 67/12
USPC .................................................... 340/539.13
See application file for complete search history.

(56) References Cited

U.S. PATENT DOCUMENTS

| | | | | |
|---|---|---|---|---|
| 4,242,684 A | * | 12/1980 | Wolverton | H01Q 1/088 343/715 |
| 5,101,213 A | * | 3/1992 | Harada | H01Q 1/088 343/715 |
| 5,225,828 A | | 7/1993 | Walleston | |
| 5,325,104 A | * | 6/1994 | Harada | H01Q 1/088 343/715 |
| 5,890,794 A | * | 4/1999 | Abtahi | B60Q 7/00 362/294 |
| 6,191,755 B1 | * | 2/2001 | Hamaaratsu | H01Q 1/242 343/895 |
| 7,412,898 B1 | | 8/2008 | Smith et al. | |
| 7,937,817 B2 | | 5/2011 | Sarh et al. | |
| 8,279,067 B2 | | 10/2012 | Berger et al. | |
| 9,228,887 B2 | | 1/2016 | Soma' et al. | |
| 2002/0036594 A1 | * | 3/2002 | Gyenes | H01Q 9/14 343/745 |
| 2008/0068519 A1 | | 3/2008 | Adler et al. | |

(Continued)

FOREIGN PATENT DOCUMENTS

| | | |
|---|---|---|
| CN | 206038916 U | 3/2017 |
| JP | 2014225075 A | 12/2014 |
| KR | 20160046685 A | 4/2016 |

*Primary Examiner* — Kerri L McNally (57) ABSTRACT

A smart attachment, or more particularly a wireless beacon for coupling with at least one of an attachment and a work vehicle that operates in rugged environments. The beacon comprises a cylindrical housing with a proximal surface and a distal surface coupled with a fastener. This beacon may further comprise a power source, a printed circuit board, an antenna, and an accelerometer, all located within the cylindrical housing.

20 Claims, 8 Drawing Sheets

(56) References Cited

U.S. PATENT DOCUMENTS

| | | | |
|---|---|---|---|
| 2008/0074323 A1* | 3/2008 | Ryken | H01Q 9/0442 343/700 MS |
| 2010/0097208 A1 | 4/2010 | Rosing et al. | |
| 2010/0145865 A1 | 6/2010 | Berger et al. | |
| 2011/0121734 A1 | 5/2011 | Pape | |
| 2013/0265208 A1* | 10/2013 | Sawaya | H01Q 1/42 343/872 |
| 2014/0062713 A1* | 3/2014 | Skertich, Jr. | F21V 5/04 340/815.45 |
| 2014/0239065 A1 | 8/2014 | Zhou et al. | |
| 2017/0184257 A1* | 6/2017 | Belitz | B60Q 1/2611 |

* cited by examiner

SMART ATTACHMENT FOR A WORK VEHICLE

CROSS-REFERENCE TO RELATED APPLICATIONS

N/A

FIELD OF THE DISCLOSURE

The present disclosure relates to a smart attachment, or more particularly, a wireless beacon for coupling with at least one of an attachment and a work vehicle that operates in rugged environments.

BACKGROUND

In construction, forestry, and other work vehicle applications, it is useful to temporarily secure different attachments to a work vehicle. For example, a first attachment such as a liquid reservoir or other container, or a construction implement or tool, can be temporarily secured to a work vehicle during a particular set of construction operations. For different operations, such as levelling the ground or creating a specified gradient, the first attachment can then be replaced, with another different attachment. Therefore a multitude of attachments may be transported to and scattered throughout a construction area.

Therein lies a need to easily track and manage the inventory of attachments in a construction area. More specifically, a beacon, or a wireless means of tracking attachments within a predefined range is desirable. Conventional tracking devices used in alternative industries lack the durability to withstand the extreme conditions commonly encountered by work vehicles and their attachments.

Examples of typical conditions attachments encounter in a rugged environment include frequent vibrations; water from outdoor weather conditions, water exposure from digging under water, and water from high pressure washing; high impact from aggregate materials such as dirt, rocks, and objects falling from the normal digging process; extreme temperatures ranging from sixty degrees Celsius to negative forty degrees Celsius; and shock resulting from attachments such as hammers, grinders, and buckets slamming into the ground, and vibrations attachments encountered when connected to crawlers and grinders in travel mode.

Therein lies a need for a beacon with a fastener capable of withstanding the aforementioned rugged conditions while maintaining function and reasonable costs to manufacture.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure relates to a smart attachment, or more particularly a wireless beacon for use on attachments for a work vehicle or the work vehicle itself that operates in rugged environments.

According to an aspect of the present disclosure, a beacon subassembly for use with an attachment for a work vehicle, the attachment coupled to a fastener comprising a cylindrical recess wherein the cylindrical recess comprises a helical ridge which spirals about the center line axis of the cylindrical recess. The beacon subassembly may comprise a cylindrical housing with a proximal surface and a distal surface and a threaded surface between the proximal surface and the distal surface, wherein the threaded surface couples with helical ridge of the fastener. This beacon subassembly may also comprise a power source, a printed circuit board, and antenna, all located within the cylindrical housing.

The beacon subassembly may further comprise a proximal surface of the cylindrical housing which is at least one of flush and below a proximal surface of the fastener.

The beacon subassembly may further comprise at least a pair of diametrically opposed recesses positioned on the proximal surface of the cylindrical. In an alternative embodiment, the beacon subassembly may comprise at least one hex-shaped recess centered on the proximal surface of the cylindrical housing.

The beacon subassembly may comprise a polymer.

The beacon subassembly may further comprise a honeycomb structure on at least a portion of the cylindrical housing.

The beacon subassembly may further comprise a pressure activated adhesive on the threaded surface of the cylindrical housing.

The beacon subassembly may further comprise an accelerometer coupled with the power source.

In an alternative embodiment, the beacon subassembly may be coupled with a fastener through an annular snap joint coupling the cylindrical housing and the fastener.

According to an aspect of the present disclosure, a method of activating a beacon subassembly for transmission and receipt of signals may include receiving a beacon subassembly where the beacon subassembly comprises a power source, a printed circuit board coupled with the power source, an antenna coupled with the printed circuit, and an accelerometer coupled with the power source, for use with an attachment of a work vehicle; applying a force exceeding a predetermined threshold to the beacon subassembly; receiving accelerometer data from an accelerometer in the beacon subassembly; activating the power source for use in the beacon subassembly upon reaching the predetermined threshold; and coupling the beacon subassembly with the attachment for a work vehicle.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
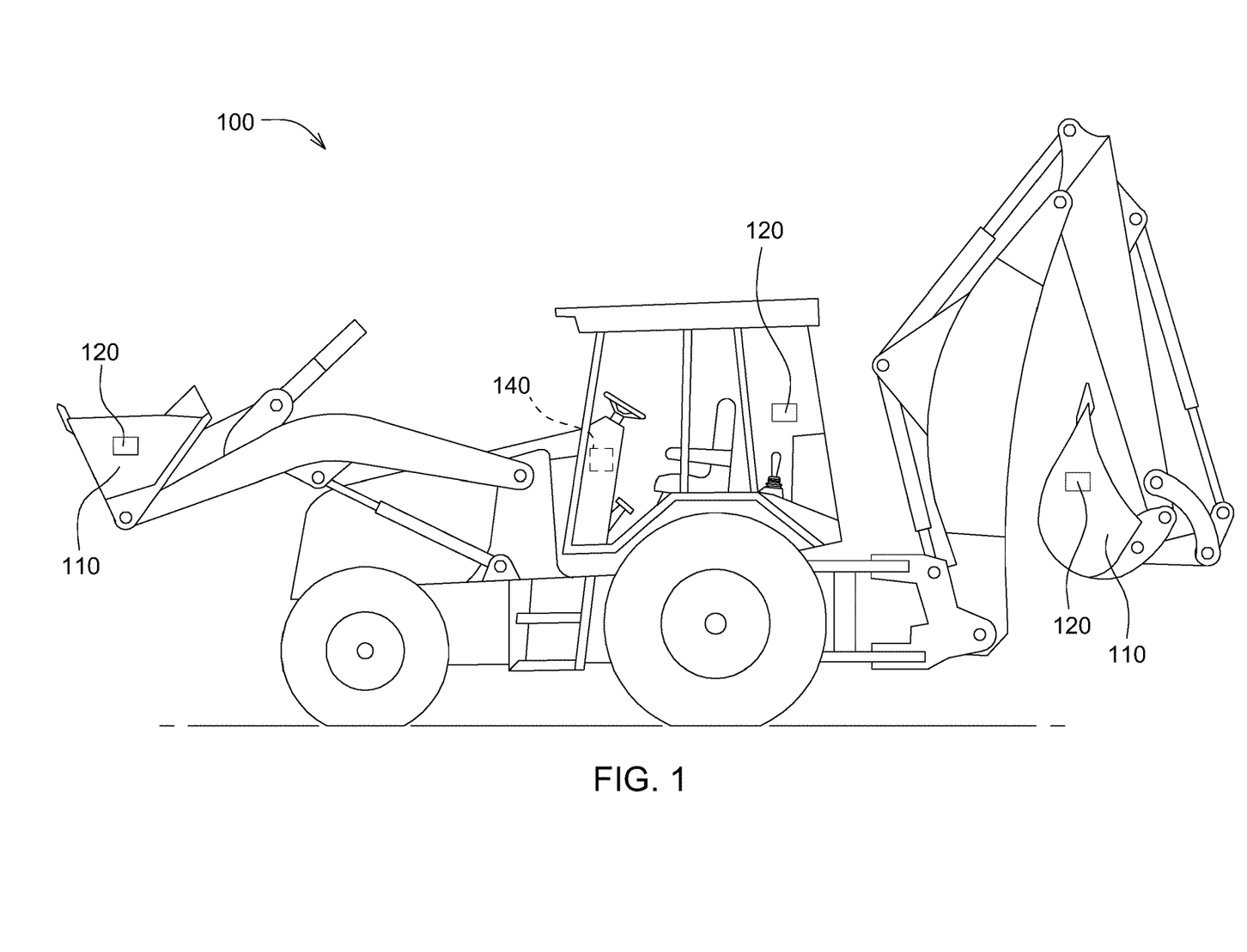
FIG. 1 is a side view of a backhoe loader with one embodiment of a beacon.

FIG. 1 is a perspective view of work vehicle 100. Work vehicle 100 is illustrated as backhoe loader, but may be any work vehicle with a series of interchangeable attachments such as an excavator, a crawler, a skid loader, skid steer, and tractor, to name a few examples. Please note the work vehicle may be any of a number of work vehicles for various functions with interchangeable attachments (e.g. construction, forestry, agriculture). In this particular embodiment, work vehicle 100 may be used to move material, such as soil, aggregate (e.g. sand, gravel, rock), and trash, from one location to another location, to create a flat area on top of the ground, or to sculpt particular features or grades onto the ground, to name a few but potential uses. A series of interchangeable attachments 110 may be used to acquire the result achieved. One or more beacons 120 may be coupled to the work vehicle 100, wherein the beacon 120 is located on either the attachment 110, the work vehicle 100, or both. The beacon 120 according to the present embodiment may perform a multitude of functions. For example, the beacon 120 may function as a unique identifier and locating device, wherein the beacon 120 communicates with the work vehicle controller 140 as well as a software application 150 on a mobile device 160 (as shown in FIG. 2)

Figure 2:
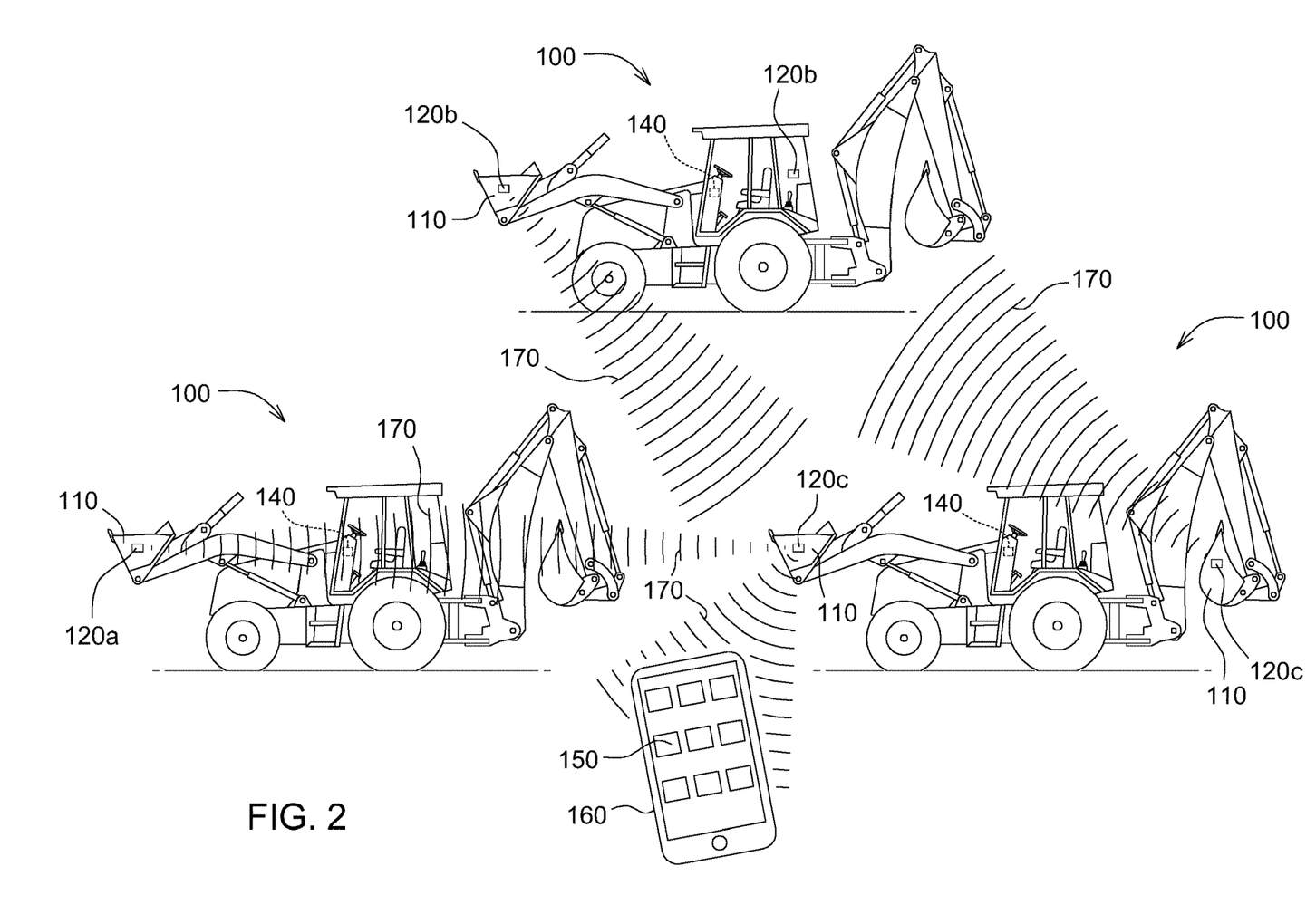
FIG. 2 is a perspective view of a family network of beacons shown on a plurality of work vehicles.

Now turning to FIG. 2, the beacon 120 may also communicate with other beacons (120a, 120b, 120c) on a plurality of work vehicles within a family network of beacons 120, thereby extending the range communication signal 170 transmits. That is, a beacon 120a may repeat an outgoing signal 170 from, for example, a first beacon 120a to a third beacon 120c. The beacon 120 may facilitate the aggregation of data, assess the localized inventory of work vehicles 100 and attachments 110 (i.e. within a few thousand feet), set default settings for a work vehicle 100 when an attachment 110 is coupled with the work vehicle 100, and assess the remaining life use of an attachment 110 prior to the need of repair or maintenance. Placement of the beacon 120 is not restricted to work vehicles 100 or their attachments 110. Rather, a beacon may be placed on any person, or thing requiring tracking (e.g. a job site fuel tank, large tool box). Furthermore, the beacon 120 may be placed in a location such as a fence (not shown) to act as a repeater of a communication signal 170, thereby extending the range. In one embodiment, the beacon 120 may communicate a signal 170 to an application 150 on a mobile device 160 or a controller on a work vehicle incorporating data such as, but not limited to, use time, location, ownership identification, battery life status, Bluetooth signal strength, hours of operation, temperature, part identification, serial number, model number, and settings appropriate for the associated attachment 110 or work vehicle 100. In another embodiment, a controller 140 on the work vehicle 100 may read an outgoing signal 170 from a beacon 120 on an attachment 110 and automatically set corresponding work vehicle 100 settings and a work vehicle display based on the attachment 110 information.

Figure 3:
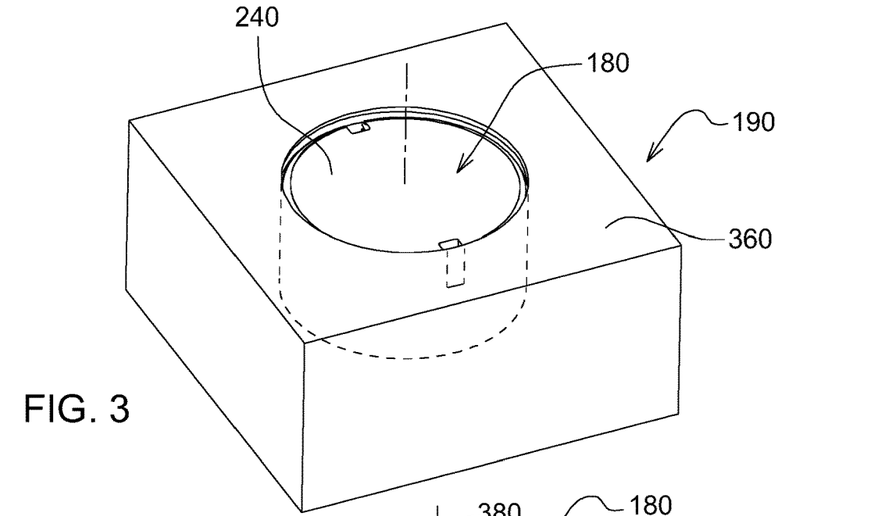
FIG. 3 is a perspective view of one embodiment of a beacon.

As shown in FIG. 3, the beacon according to the present embodiment physically measures at most a few inches in height and across, weighs less than a pound, requires no external power, is wireless and can be attached readily and quickly to any work vehicle by an individual.

Figure 4:
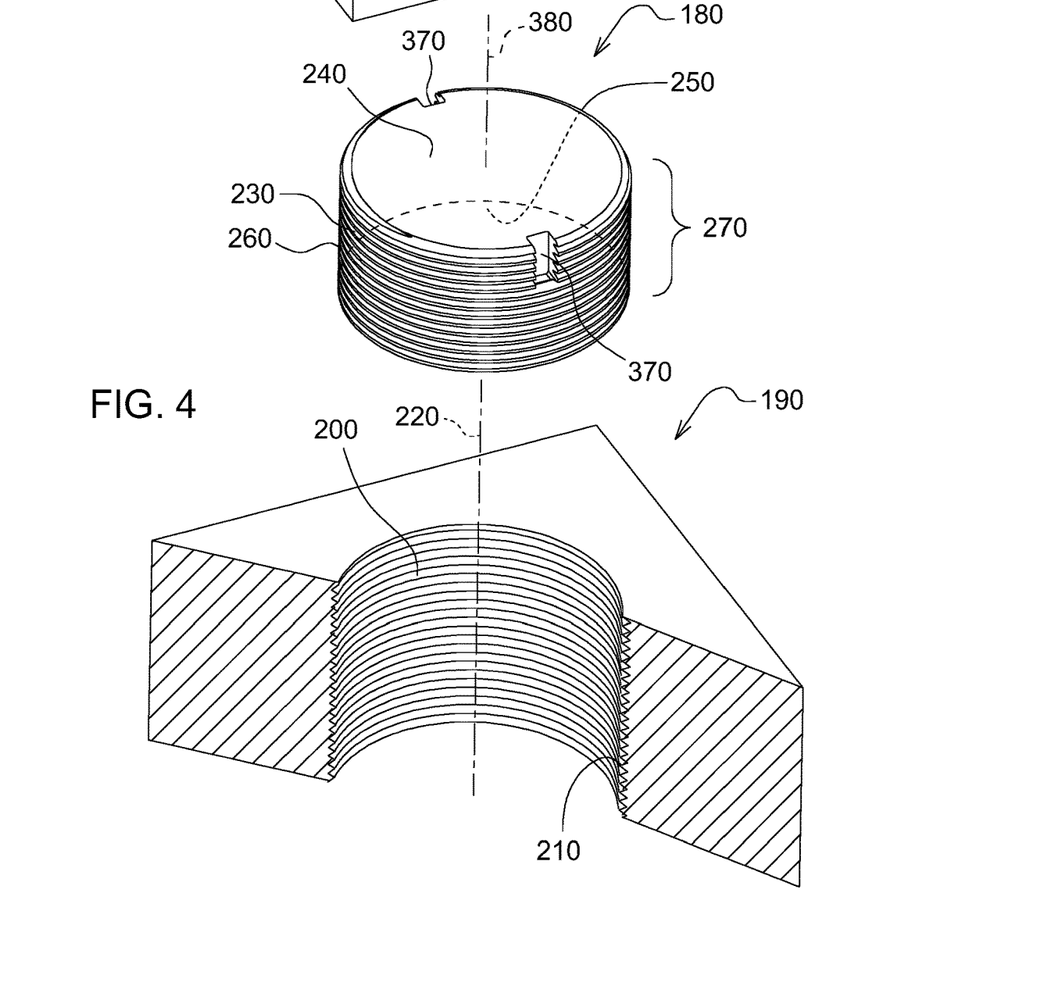
FIG. 4 is an exploded view of one embodiment of a beacon.
Figure 5:
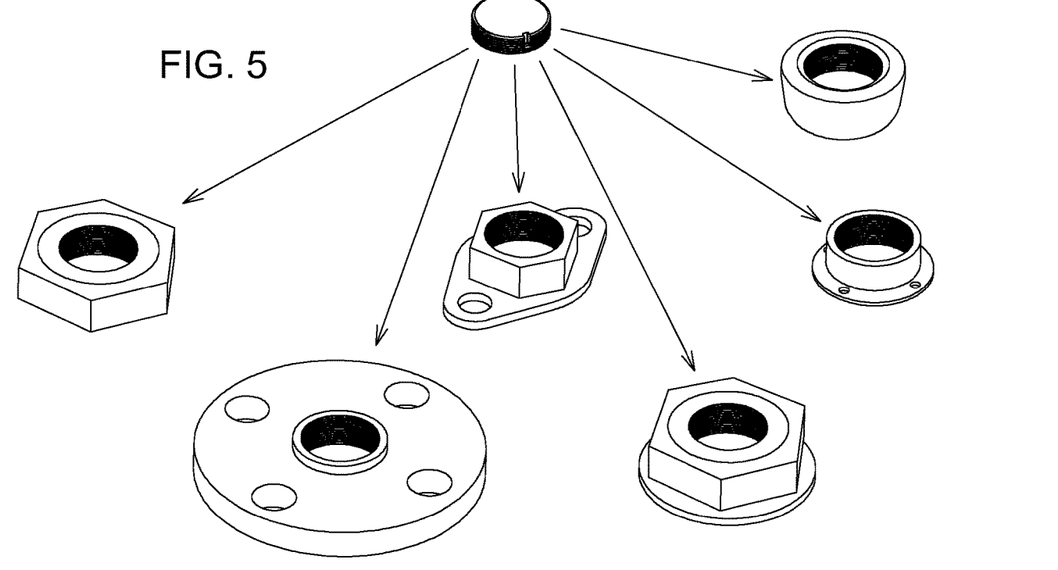
FIG. 5 is a perspective view of several possible variations of a fastener for coupling with one embodiment of a beacon subassembly.

FIG. 3 illustrates one embodiment of a beacon subassembly 180 and a fastener 190 for attachment to a work vehicle 100. The work vehicle 100 (not shown) may be coupled to a fastener 190. As shown in FIG. 4, this fastener 190 comprises a cylindrical recess 200 wherein the cylindrical recess 200 comprises a helical ridge 210 which spirals about the centerline axis 220 of the cylindrical recess 200. The fastener 190 may be any hardware device affixing the beacon subassembly 180 to the work vehicle 100, or any extension thereof. The fastener 190 may be a customized fastener, an off-the-shelf component, or a pre-existing fastener previously integrated into the work vehicle 100. The fastener 190 in FIGS. 3 and 4 embody a generic rectangular structure, however this is figurative of a multitude of fasteners that may be used with the beacon subassembly 180. FIG. 5 exemplifies few of several possible variations for a fastener component. However the configuration, the fastener 190 must comprise a cylindrical recess 200 wherein the cylindrical recess 200 may comprise a helical ridge 210. The cylindrical recess 200 couples with the beacon subassembly 180. The fastener 190 may also comprise of various materials such metal, plastic, wood, rubber or any other material that may provide sufficiently robust protection from the severe atmospheric and environmental conditions (e.g. extreme temperatures, impact from soil and aggregate material, moisture, shock and extreme vibrations discussed above) to which the work vehicle 100 is exposed. The aforementioned severe conditions are few of several conditions a fastener 190 and beacon subassembly 180 may encounter.

Figure 6:
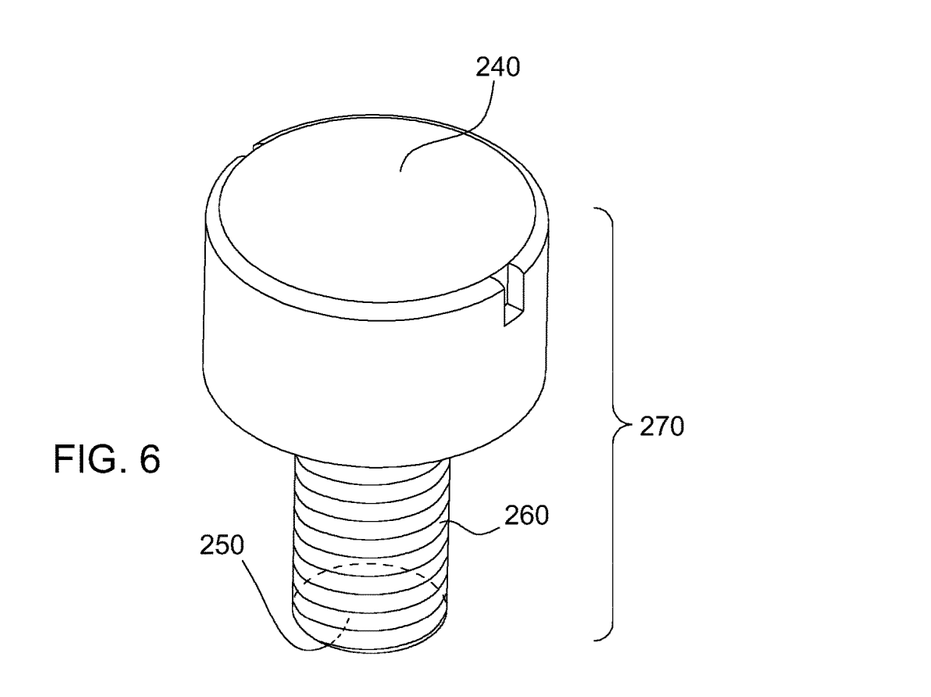
FIG. 6 is a perspective view of another embodiment of a beacon subassembly.

Now returning to FIG. 4, the beacon subassembly 180 comprises a cylindrical housing 230 with a proximal surface 240, a distal surface 250, and a threaded surface 260 between the proximal surface 240 and the distal surface 250 of the cylindrical housing 230 wherein the threaded surface 260 couples with the helical ridge 210 of the fastener 190. In one embodiment, the threaded surface 260 encompasses at least a substantial portion of the surface 270 between the distal surface 250 and the proximal surface 240 (also shown in in an alternative embodiment in FIG. 6). Per FIG. 4, the threaded surface 260 encompasses the whole surface 270 between the distal surface 250 and the proximal surface 240 to maximize the coupling strength of the beacon subassembly 180 and the fastener 190. Now turning to FIG. 1, the distal surface 250 is the surface positioned towards the work vehicle 100. Alternatively, the proximal surface 240 is the surface positioned away from the work vehicle 100. The proximal surface 240 is also the surface of the beacon subassembly 180 most likely directly exposed to harsh conditions from the surrounding environment (e.g. rain, ice, snow, soil, aggregate, etc.) and is generally the surface through which communications are sent and received. Now referring to FIG. 7, in an alternative embodiment, the proximal surface 240 may comprise a coating 280 (shown figuratively as a speckled surface) with a higher fracture toughness or higher impact absorption than the material of the cylindrical housing 230, or an insulating thin film minimizing the effects of extreme thermal variations to the components 290 located within the beacon subassembly 180.

Figure 8A:
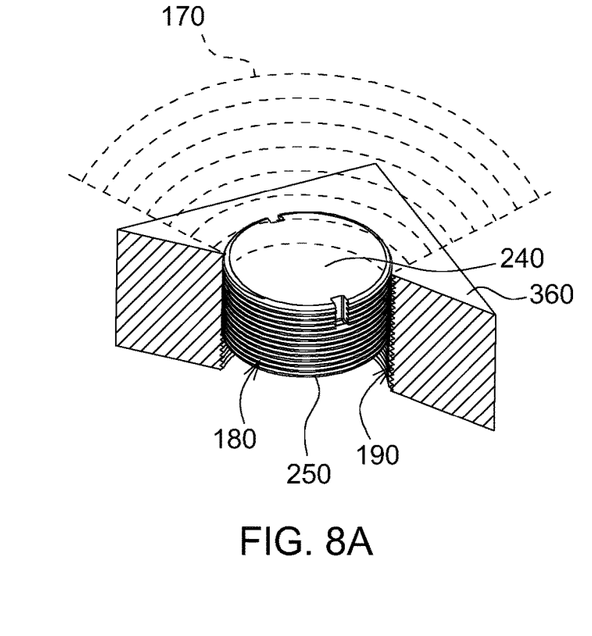
FIGS. 8a and 8b are perspective views of embodiments of a beacon demonstrating the effects of positioning the antenna on the scope of communication signals.
Figure 8B:
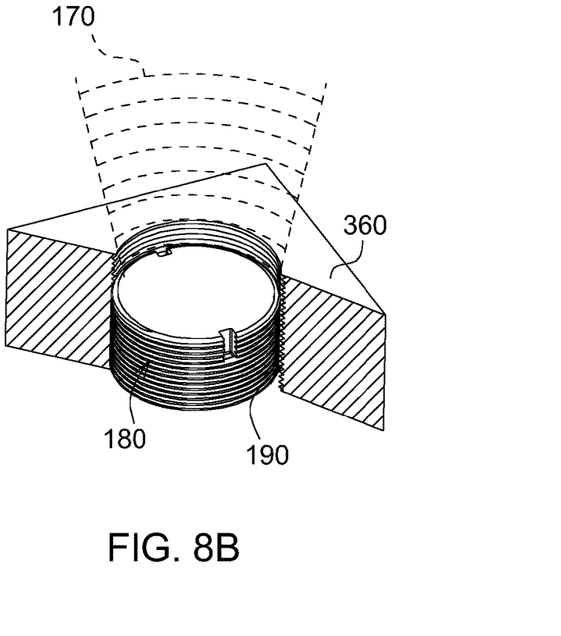

Returning to FIG. 3, the cylindrical housing 230 of the beacon subassembly 180 may be manufactured in a number of different forms. In one embodiment, the cylindrical housing 230 may comprise a shell (not shown) wherein the electronic components 290 (e.g. power source 310, printed circuit board 320, antenna 330) are placed therein and the cylindrical housing 230 is filled with a polymer or resin 340. The polymer or resin 340 filling is then cured or hardened thereby securing the electronic components 290 in place. Placement of each electronic component 290 in their respective positions effects the function of the beacon 120. As shown in FIG. 8a, one embodiment of a beacon 120, the antenna 190 is placed closer to the proximal surface 240 of the beacon subassembly 180, preferably 1-3 mm below the proximal surface 240, to maximize the strength and scope of sending and receiving communication signals 170, thereby creating a clear line-of-sight between the antenna and the signal. Alternatively, if the antenna were placed further below the proximal surface 240, the scope of sending and receiving the communications signals 170 would narrow. The power source 310, on the other hand, is preferably located closer to the distal surface 250 of the beacon subassembly 180 away from obstructing the path of communication for signals 170. On a similar note, as shown in FIG. 8b, if the proximal surface 240 of the beacon subassembly is positioned further below the proximal surface of the fastener 360, the scope of sending and receiving communication signals 170 would narrow.

In an alternative embodiment, the cylindrical housing 230 may comprise of a solid, single-piece polymer or resin cylindrical housing 230 wherein the electronic components 290 may be placed in a mold (not shown) prior to pouring and curing of the polymer or resin 340. Once removed from the mold, the threaded surface 260 between the distal surface 250 and the proximal surface 240 of the beacon subassembly 180 (shown in FIG. 4) may be machined, or etched. In an alternative embodiment, the threaded surface 260 may pre-exist in the mold (not shown) and the mold destroyed upon removal of the beacon subassembly 180.

Returning to FIG. 7, a power source 310 is located within the cylindrical housing 230. In one embodiment, the power source is functional between negative forty degrees Celsius and eighty-five degrees Celsius.

Figure 7:
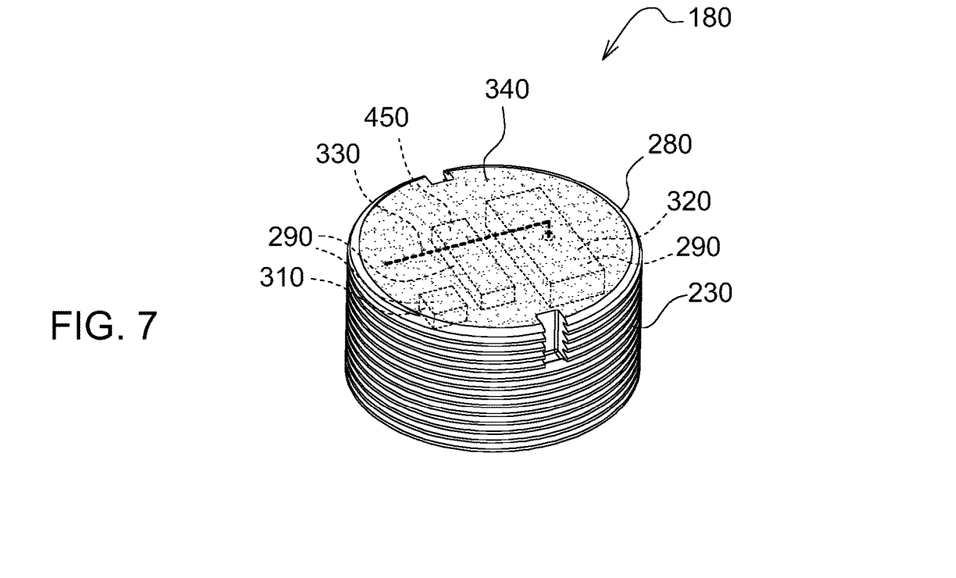
FIG. 7 is a perspective view of another embodiment of a beacon subassembly.

A printed circuit board 320 coupled with the power source 310 is also located within the cylindrical housing 230. The power source 310 is soldered, sonic welded or affixed in such a manager that it cannot become loose or disconnected due to shock or vibration.

An antenna 330 coupled with the printed circuit board 320 is also located within cylindrical housing 230. In one embodiment, the antenna 330 is optimally sized to match the frequency of communication signals 170 sent from and received to the beacon 120.

Returning to FIG. 3, the proximal surface 240 of the cylindrical housing 180 is at least one of flush and below a proximal surface of the fastener 360, allowing the proximal surface of the fastener 360 to shield beacon subassembly 180 from impact forces.

Now turning to FIG. 4, the cylindrical housing 230 may further comprise at least a pair of diametrically opposed recesses 370 positioned on the proximal surface 240 of the cylindrical housing 230. The diametrically opposed recesses 370 may be equidistant from the centerline axis of the cylindrical housing 380. The diametrically opposed recesses 370 may further be of similar size and shape. The diametrically opposed recesses 370 couple with a tool, possibly a two-prong tool, thereby allowing an individual to quickly assemble a beacon subassembly 180 to a fastener 190. In one embodiment, the recesses 370 are slots positioned tangentially along the perimeter of the proximal surface 240. Positioning of the recesses tangentially along the perimeter allows a large central surface area for the receipt of communication signals 170 and the outgoing transmission of communication signals 170. Additionally, placement of the two diametrically opposed recesses 370 creates two independent points of contact to distribute the torque force over a greater surface area when assembling the beacon subassembly 180 to the fastener 190. The recesses 370 may be of any shape, fit, or form (e.g. slots, circular, square, ovals, cones) as long as there are at least two diametrically opposed contact areas for a tool to abut against.

Figure 9A:
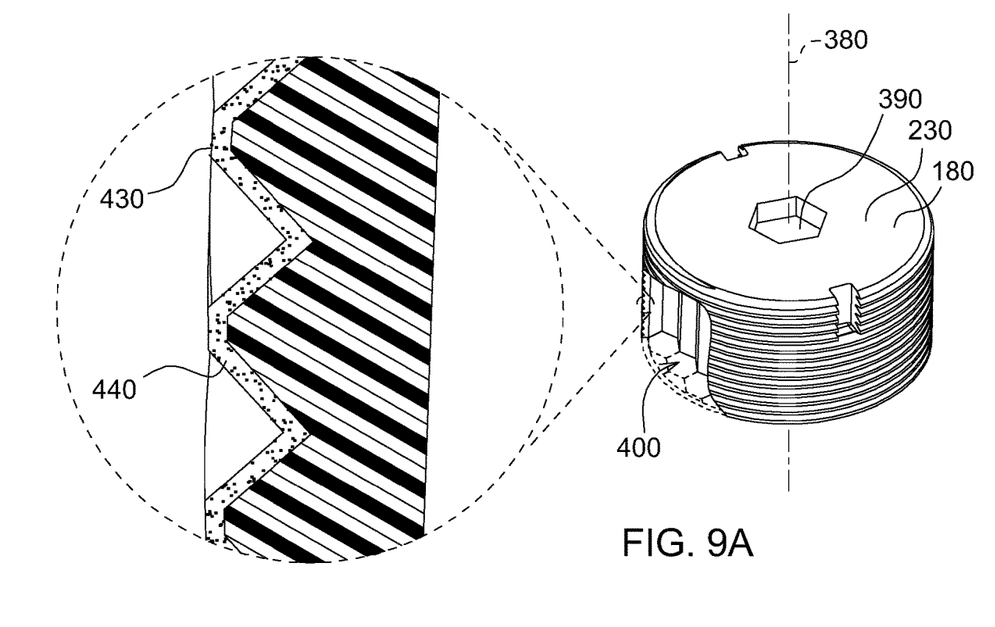
FIGS. 9a and 9b are perspective views of another embodiment of a beacon subassembly demonstrating other alternative features.
Figure 9B:
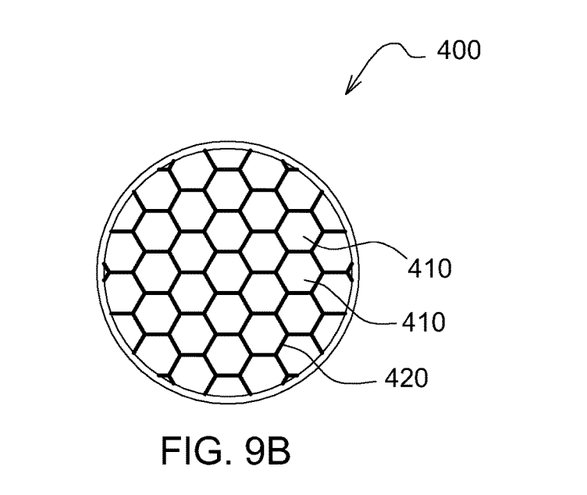

Now turning to FIG. 9, in an alternative embodiment, the cylindrical housing may comprise of at least one hex-shaped recess 390 coaxial with the centerline axis of the cylindrical housing 380. This hex-shaped recess 390 couples with a tool (e.g. a hex key) to allow an individual to quickly assemble a beacon subassembly to a fastener.

Also shown in FIG. 9, the beacon subassembly 180 may further comprise a honeycomb structure 400 on at least a portion of the cylindrical housing 230. A honeycomb structure 400 allows the minimization of the amount of material used to minimize weight and costs. The geometry of the honeycomb structure 400 may vary but the common feature of all such structures is an array of hollow cells 410 formed between thin vertical walls 420. The cells are often columnar and hexagonal in shape. Additionally, incorporating a honeycomb structure 400 on at least a portion of the cylindrical housing may prevent the propagation of stress fractures and increase the absorption of stress impact, thereby increasing the beacon subassembly's 180 strength.

Additionally exemplified in FIG. 9, the threaded surface 260 of the cylindrical housing 230 may further comprises a coating of adhesive 430 to prevent loosening and corrosion. The adhesive 430 coating may pressure-activated comprising of microspheres 440 which burst and release adhesive upon shear forces encountered when the beacon subassembly 180 is coupled with the fastener 190. In an alternative embodiment, the threaded surface 260 may comprise a coating of adhesive 430 that is thread-locking. Thread-locking coatings rely on the electrochemical activity of a metal substrate to form a bond. When the beacon subassembly 180 is coupled with the fastener 190, the cylindrical housing 230 (typically a polymer or resin 340) comes into contact with the fastener 190 possibly made of a metal material. Other alternative adhesive coatings may also be used where light, shearing forces, application of specific wavelengths, or substrate contact activate the bonds between the beacon subassembly 180 and the fastener 190.

Returning to FIG. 7, the cylindrical housing 230 may further comprise an accelerometer 450 coupled to the power source 310. An accelerometer 450 is a device for measuring reaction forces that are generated by acceleration and/or gravity. Accelerometers may be used to sense inclinations, motion, vibration, and shock. In one embodiment, when a beacon 120 is mounted on an attachment 110, the accelerometer 450 is used for measuring hours of attachment usage by sensing and measuring time segments when the device is vibrating or in motion. Additionally, when the accelerometer reaches a pre-determined threshold of velocity or force, the beacon may toggle the collection frequency of data from one frequency to another.

Figure 10A:
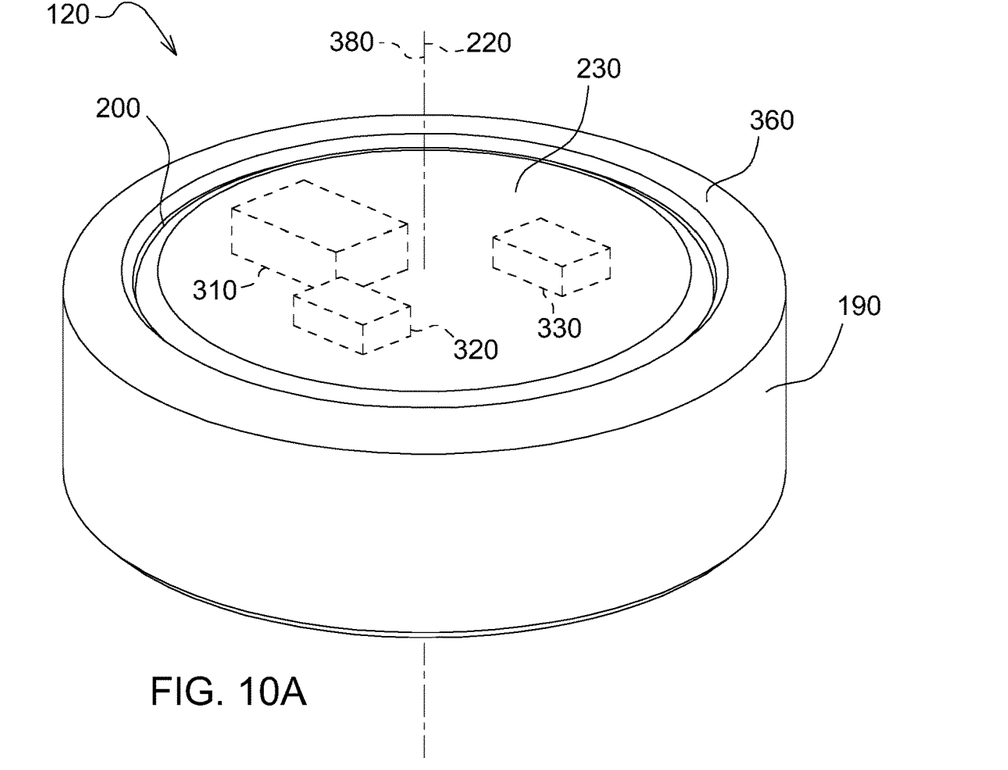
FIGS. 10a and 10b are perspective views of another embodiment of a beacon featuring an annular snap joint coupling the cylindrical housing and the fastener.
Figure 10B:
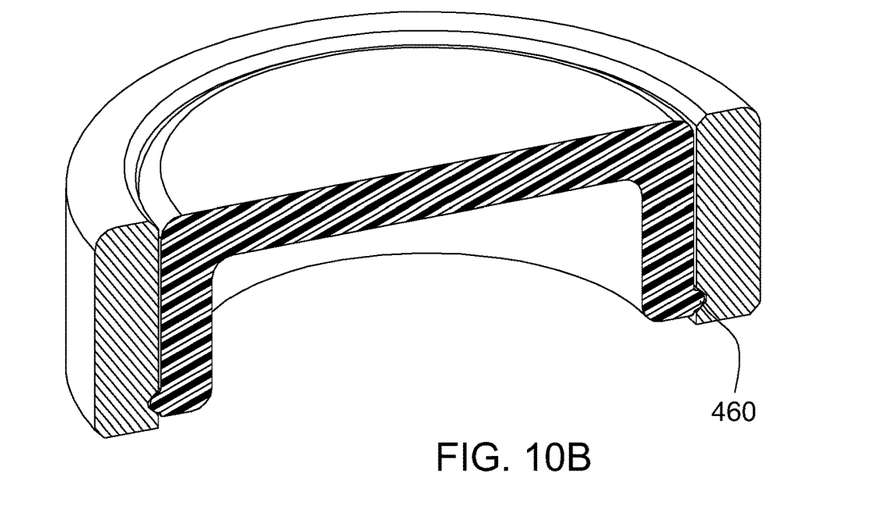

Referring now to FIGS. 10a and 10b, in an alternative embodiment, a beacon 120 for use with at least one of a work vehicle 100 and an attachment 110 thereof, may comprise a fastener 190 comprising a cylindrical recess 200 wherein the cylindrical recess 200 comprises a first centerline axis 220, a cylindrical housing 230 with a proximal surface 240 and a distal surface (hidden) wherein the cylindrical housing 230 comprises a second centerline axis 380, a power source 310 located within the cylindrical housing 230, a printed circuit board 320 coupled with the power source 310 wherein the printed circuit board 320 is located within the cylindrical housing 230, an antenna 330 coupled with the printed circuit board 320 wherein the antenna 330 is located within the cylindrical housing 230, and an annular snap joint 460 coupling the cylindrical housing 230 and the fastener 190 wherein the first centerline axis 220 and the second centerline axis 380 coincide. This embodiment may further comprise of the alternative features discussed above (e.g. a coating 280, a hex-shaped recess 390, an adhesive 430, two diametrically opposed recesses 370, an accelerometer 450).

Figure 11:
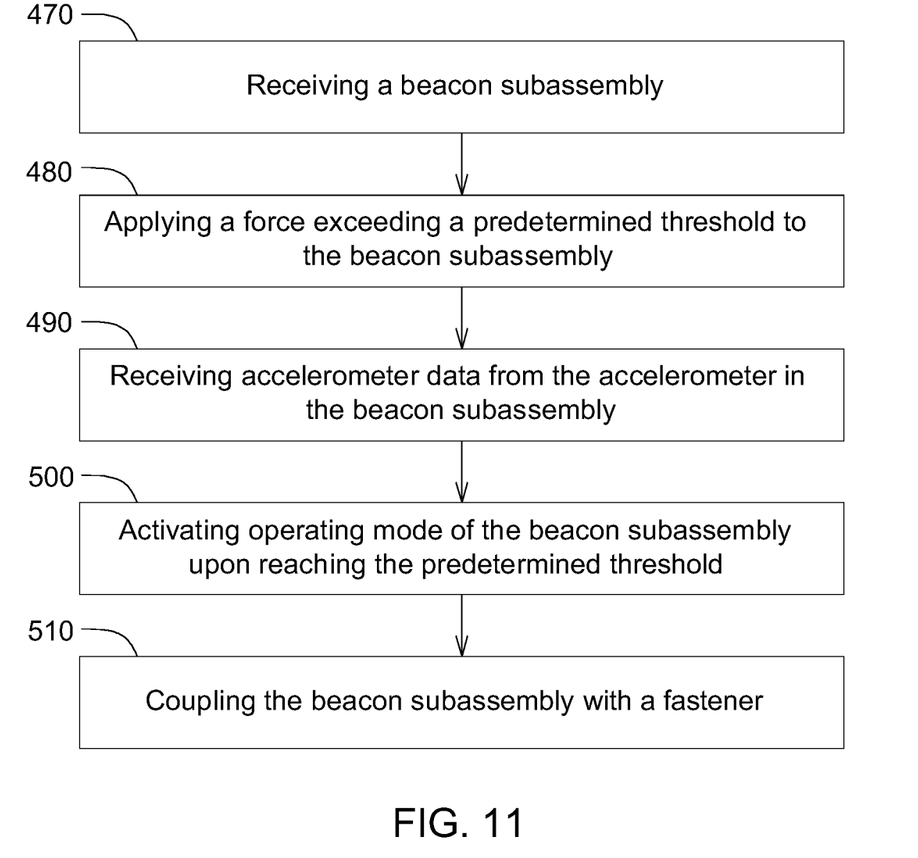
FIG. 11 is a flowchart on a method activating a beacon subassembly.

Furthermore, a beacon subassembly 180 may be stored at a storage facility or a dealership prior to use. As shown in the flowchart in FIG. 11, to mitigate depletion of the power source 310 within the beacon subassembly 180, a method of activating a beacon subassembly 180 prior to use (e.g. prior to the transmission and receipt of signals 170) may comprise receiving 470 a beacon subassembly 180 wherein the beacon subassembly 180 comprises a power source 310, a printed circuit board 320 coupled with the power source 310, an antenna 330 coupled with the printed circuit board 320, and an accelerometer 450 coupled with the power source 310; applying a force exceeding a predetermined threshold 480 to the beacon subassembly 180; receiving accelerometer data 490 from the accelerometer 450 in the beacon subassembly 180; activating the operating mode 500 of the beacon subassembly 180 upon reaching the predetermined threshold; and coupling the beacon subassembly 510 with a fastener 190 for coupling at least one of a work vehicle 100 or an attachment 110 thereof.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A beacon subassembly for use with an attachment for a work vehicle, the attachment coupled to a fastener comprising a cylindrical recess wherein the cylindrical recess comprises a helical ridge which spirals about the centerline axis of the cylindrical recess, the beacon subassembly comprising:
    a cylindrical housing with a proximal surface and a distal surface and a threaded surface between the proximal surface and the distal surface of the cylindrical housing wherein the threaded surface couples with the helical ridge of the fastener;
    a power source located within the cylindrical housing;
    a printed circuit board coupled with the power source wherein the printed circuit board is located within the cylindrical housing, and
    an antenna coupled with the printed circuit board wherein the antenna is located within the cylindrical housing.

2. The beacon subassembly of claim 1, wherein the proximal surface of the cylindrical housing is at least one of flush and below a proximal surface of the fastener.

3. The beacon subassembly of claim 1, wherein the cylindrical housing further comprises at least a pair of diametrically opposed recesses positioned on the proximal surface of the cylindrical housing.

4. The beacon subassembly of claim 1, wherein the cylindrical housing further comprises at least one hex-shaped recess centered on the proximal surface of the cylindrical housing.

5. The beacon subassembly of claim 1, wherein the cylindrical housing comprises a polymer.

6. The beacon subassembly of claim 1, wherein the cylindrical housing further comprises a honeycomb structure on at least a portion of the cylindrical housing.

7. The beacon subassembly of claim 1, wherein the threaded surface of the cylindrical housing further comprises a pressure activated adhesive.

8. The beacon subassembly of claim 1, wherein the cylindrical housing further comprises an accelerometer coupled with the power source.

9. A beacon for attachment to a work vehicle, the beacon comprising:
    a fastener comprising a cylindrical recess wherein the cylindrical recess comprises a helical ridge which spirals about a centerline axis of the cylindrical recess, a cylindrical housing with a proximal surface and a distal surface and a threaded surface between the proximal surface and the distal surface of the cylindrical housing wherein the threaded surface couples with the helical ridge of the fastener,
    a power source located within the cylindrical housing,
    a printed circuit board coupled with the power source wherein the printed circuit board is located within the cylindrical housing, and
    an antenna coupled with the printed circuit board wherein the antenna is located within the cylindrical housing.

10. The beacon subassembly of claim 8, wherein the cylindrical housing further comprises at least a pair of diametrically opposed recesses positioned on the proximal surface of the cylindrical housing.

11. The beacon subassembly of claim 8, wherein the cylindrical housing further comprises at least one hex-shaped recess centered on the proximal surface of the cylindrical housing.

12. The beacon subassembly of claim 8, wherein the cylindrical housing comprises a polymer.

13. The beacon subassembly of claim 8, wherein the threaded surface of the cylindrical housing further comprises a pressure activated adhesive.

14. The beacon subassembly of claim 8, wherein the cylindrical housing further comprises an accelerometer coupled to the power source.

15. The beacon subassembly of claim 8, wherein the proximal surface of the cylindrical housing is at least one of flush and below a proximal surface of the fastener.

16. The beacon subassembly of claim 8, wherein the cylindrical housing further comprises a honeycomb structure on at least a portion of the cylindrical housing.

17. A beacon for attachment to a work vehicle, the beacon comprising:
 a fastener comprising a cylindrical recess wherein the cylindrical recess comprises a first centerline axis,
 a cylindrical housing with a proximal surface and a distal surface wherein the cylindrical housing comprises a second cylindrical axis,
 a power source located within the cylindrical housing,
 a printed circuit board coupled with the power source wherein the printed circuit board is located within the cylindrical housing,
 an antenna coupled with the printed circuit board wherein the antenna is located within the cylindrical housing,
 an accelerometer coupled to the power source, and
 an annular snap joint coupling the cylindrical housing and the fastener wherein the first centerline axis and the second centerline axis coincide.

18. The beacon subassembly of claim 8, wherein the cylindrical housing further comprises at least a pair of diametrically opposed recesses positioned on the proximal surface of the cylindrical housing.

19. The beacon subassembly of claim 8, wherein the proximal surface of the cylindrical housing is at least one of flush and below a proximal surface of the fastener.

20. The beacon subassembly of claim 8, wherein the cylindrical housing further comprises a honeycomb structure on at least a portion of the cylindrical housing.

\* \* \* \* \*